(12) United States Patent
Lewis (10) Patent No.: US 11,906,104 B2
(45) Date of Patent: Feb. 20, 2024

(54) PROPPING TOOL

(71) Applicant: Richard Robert Lewis, Truxton, NY (US)

(72) Inventor: Richard Robert Lewis, Truxton, NY (US)

( * ) Notice: Subject to any disclaimer, the term of this patent is extended or adjusted under 35 U.S.C. 154(b) by 21 days.

(21) Appl. No.: 17/722,932

(22) Filed: Apr. 18, 2022

(65) Prior Publication Data

US 2022/0333732 A1 Oct. 20, 2022

Related U.S. Application Data (60) Provisional application No. 63/176,232, filed on Apr. 17, 2021.

(51) Int. Cl.
*F16M 13/00* (2006.01)

(52) U.S. Cl.
CPC ................ *F16M 13/005* (2013.01)

(58) Field of Classification Search
CPC .... F16M 13/005; F16M 11/242; F16M 11/38; F16M 11/16; A46B 17/02; A47L 13/51; A45C 2200/15
USPC ................. 248/49, 96, 440.1, 166, 168–171
See application file for complete search history.

(56) References Cited

U.S. PATENT DOCUMENTS

| | | | | |
|---|---|---|---|---|
| 2,324,439 A | * | 7/1943 | Thommen | A63B 55/57 206/315.7 |
| 2,444,369 A | * | 6/1948 | Rentos | A24F 15/18 206/265 |
| 3,606,898 A | | 9/1971 | Harocopo | |
| 4,091,828 A | | 5/1978 | Jorgensen | |
| 6,708,831 B1 | | 3/2004 | Balassi | |
| 8,522,965 B1 | * | 9/2013 | Hsiung | A45C 11/00 206/45.24 |

(Continued)

FOREIGN PATENT DOCUMENTS

| | | |
|---|---|---|
| DE | 4034755 A1 | 5/1992 |
| DE | 29806807 U1 | 7/1998 |

(Continued)

OTHER PUBLICATIONS

Titleist Premium Stand Bag https://clubworks.co.in/products/titleist-premium-stand-bag-jetblack?_pos=1&_sid=9b2f9b67a&_ss=r.

(Continued)

*Primary Examiner* — Ingrid M Weinhold
(74) *Attorney, Agent, or Firm* — Bond, Schoeneck & King, PLLC; George R. McGuire (57) ABSTRACT

A device for propping up an object, in particular, a long-handled object. The device includes a V-shaped leg apparatus having a pair of legs that are spaced apart from one another but may be compressed towards one another. Leg holder attaches to the long-handled object and the two legs pass through openings formed through the leg holder. A latch is attached to the long-handled object beneath the leg holder, and a slider is selectively movable along the lengths of the two legs and when moved towards the leg holder causes the legs to spread apart and spring outwardly away from the long-handled object, and when moved towards the latch, cause the legs to be brought together and extend parallel to and adjacent the long-handled object. The slider engages with the latch to lock the device in its propping position.

2 Claims, 6 Drawing Sheets

(56) References Cited

U.S. PATENT DOCUMENTS

| | | | |
|---|---|---|---|
| 10,288,216 B1* | 5/2019 | Amanze | A47L 13/51 |
| 11,118,726 B2* | 9/2021 | Gribble | F16M 11/242 |
| 2005/0056739 A1* | 3/2005 | Koning | F16M 11/16 248/171 |
| 2012/0137548 A1* | 6/2012 | Kimball | B25G 1/04 16/110.1 |
| 2021/0145238 A1* | 5/2021 | Gribble | F16M 11/16 |

FOREIGN PATENT DOCUMENTS

| | | |
|---|---|---|
| DE | 29816315 U1 | 12/1998 |
| DE | 202009015609 U1 | 4/2010 |
| EP | 0015034 A1 | 9/1980 |
| EP | 1264587 A1 | 12/2002 |
| FR | 2603479 A1 | 3/1988 |

OTHER PUBLICATIONS

GolfBasic Prime 14 Divider Black Golf Stand Bag https://www.asiansports.in/products/golfbasic-prime-14-divider-black-golf-standbag?pos=1&_sid=a5efd043b&_ss=r.

Ping Hoofer Tour Stand Golf Bag https://www.globalgolf.com/golf-bags/1055198-ping-hoofer-tour-stand/?opt=aaa.

5" Sunday Golf Bag Stand 7 Clubs Carry Pockets Travel Storage Lightweight https://www.walmart.com/ip/5-Sunday-Golf-Bag-Stand-7-Clubs-Carry-Pockets-Travel-Storage-Lightweight/987490590.

* cited by examiner

PROPPING TOOL

CROSS-REFERENCE TO RELATED APPLICATION

This application claims priority to U.S. Provisional Patent Application Ser. No. 63/176,232, filed on Apr. 17, 2021 and entitled "Device for Propping Objects," the entire disclosure of which is incorporated herein by reference.

FIELD OF THE INVENTION

The present disclosure is directed generally to

BACKGROUND

Workers using a long-handled tools do not typically finish the task at hand in one continuous work session. Rather, for any number of reasons, a worker stops using the tool at one or more points during the completion of the overall task, physically disengaging himself/herself from the tool, only to re-engage with the tool at some later time, which commonly ranges from seconds, to minutes, to hours, to even, days, later. To practice this 'tool disengagement/re-engagement process', the worker can employ one of two general strategies.

Drop It and Pick It Up Strategy

The first one is referred to as the "Drop It and Pick It Up Strategy". To disengage, the worker transfers the tool to a nearby surface, by laying, dropping or throwing it onto the surface, with the tool coming to rest upon its side, in a more or less horizontal position. The surface in general may exist over a range of elevations relative to the tool user, but most commonly it is at ground level to waist level, and is either a natural surface, such as the surrounding soil/lawn area, a rock outcrop, or a horizontal tree trunk, or is a man-made surface, such as a floor or a paved/concrete area, or the level tops of other common features, like a table top, picnic table, bench or chairs.

The problems associated with this strategy of tool disengagement/re-engagement are several. The first one is seen in those instances in which the worker does not carefully lay the tool down onto the surface, but rather either drops it, usually from waist level, directly down to the area in the immediate vicinity of her/his feet, or actually throws it some distance further. Doing either act can result in scratches, dents or other structural damage to the tool, as it strikes other objects along its aerial route. Likewise, the tool in flight can damage the surface upon which it lands, as well as any other unintended targets that it bounces off, or otherwise strikes, along the way. In any of these cases the resulting damage to the tool can be considerable, and costly, and the remediation of damage caused to other property may cost time and money, as well as possibly lead to expensive legal suits and/or insurance claims.

A second problem with the 'Drop It and Pick it Up' strategy centers on the re-engagement step. While the act of laying, dropping or even throwing a tool onto a nearby surface usually does not entail overly strenuous physical activity on the part of the worker, the same cannot be said of the counterpart step of re-engagement. Particularly in those cases where the surface upon which the tool rests is at ground level or thereabouts, the act of picking up the tool requires the worker to bend substantially at the waist, in combination with various degrees of bending at the knees, in order to get her/his hands down far enough to grab the tool. This physical maneuvering can be taxing on the body, contributing to the overall physical exhaustion associated with performing a given work task, especially if the task at hand requires many instances of one having to retrieve a tool placed at ground level. Persons with back problems, or other muscular problems or disabilities, are even more prone to experience physical strain or injury. Some persons, in fact, simply may not be able to physically pick up a tool from a ground surface elevation.

The third problem associated with the 'Drop It and Pick It Up' strategy is that generally a tool resting in a horizontal position is more difficult to spot during the re-engagement process than if it was positioned in a more vertical orientation. For example, a leaf rake which is resting on top of the surface of a lawn is much more difficult to find, especially from a distance, than if the same rake was positioned in a more upright pose. Adding to this, and especially true in construction or landscaping situations, versus janitorial situations, the surface where the tool is resting may be covered with grass, leaves, branches, soil, gravel, mulch or other types of debris, which might be partially hiding or camouflaging the tool, making it even that much more difficult to spot the tool when seeking to retrieve it. This situation is especially problematical during job site cleanup, when the task at hand is completed, and the worker is rounding up the tools and preparing to depart, in that a horizontally placed tool may get overlooked entirely, and thus be inadvertently left behind at the work site.

The fourth problem of the 'Drop It and Pick It Up' strategy is a corollary to the third problem, in that an overlooked tool may then become a danger to persons working in that area subsequently. An unsuspecting person may trip on the tool, or fall upon the tool, causing bodily harm. Importantly, certain rakes and shovels left horizontally at ground surface level can be accidentally stepped on at the implement end of the tool, which causes the handle to arc upward rapidly toward the person, often striking in the upper body or the face and head area. In outdoor situations other contractors, such as lawn mower operators, may not see the tool laying on the lawn surface and thus run their equipment over it, possibly causing damage to the operator or to the equipment. In all of these cases innocent persons may be harmed, and the business owner/worker responsible for leaving the tool behind may very well be subject to personal injury lawsuits and/or insurance liability claims. And, of course, the tool left behind may also end up getting damaged, or permanently lost.

Stop and Prop Strategy

The second tool disengagement/re-engagement strategy is referred to as the "Stop and Prop" strategy, which occurs when a worker disengages from a tool by leaning it against another object, such that one or more points along the handle of the tool come into contact with that object, and the tool rests at a noticeably vertical orientation (which is nearly always less than a ninety degree angle). For ease of reference, the coined term 'propject' refers to 'that object against which another object is propped.'

Common propjects in outdoor settings include the walls of buildings, the trunks of trees, the branches of shrubs, the outside surfaces of automobiles or landscaping/construction machinery, and a myriad of landscape features, such as large ornamental rocks, stone walls, wooden or steel fences, statuary, garden pots, and so on. Common propjects in indoor settings include interior walls, office equipment, and a wide variety of furniture.

There are several problems associated with using a propject as the means for disengaging and re-engaging with a long-handled tool. The first, and biggest, is that a propject may not be present at all, or it may be located so far from the spot where the worker is seeking to dis-engage that he/she decides that the time and effort to walk back and forth to the propject is not a worthwhile endeavor. Put another way, the worker reasons that it is a more efficient use of energy and time, and perhaps less tedious and frustrating, to just lay, drop or throw the tool to a nearby horizontal surface (as described already during our discussion of the 'Drop It and Pick It Up' strategy).

A second problem of propject use relates to the physics involved in what we label here as the 'tool-propject interaction'. In general layman's terms, a successful propject-tool interaction must meet two physical criteria: a. the propject must have sufficient mass to be able to support the weight of the tool, and b. the surfaces of the two objects, at their areas of contact, must exhibit sufficient friction so that the tool stays put when placed against the propject. The handles of long-handled tools are circular to oval in cross section, being ergonomically designed to comfortably fit the human grip. Accordingly, they are small in diameter, which means that when such a handle is placed against most propjects the actual surface area of the handle which makes contact with the propject is very small, especially if the handle only contacts it in one spot. So, this situation, in and of itself, severely limits the amount of friction that can exist between a tool and its propject.

Turning now to a potential propject, assuming that it has sufficient mass to support the weight of a long-handled tool, minimally the propject must have a sufficiently wide surface area to accommodate the point of contact of the tool handle, but beyond that, in general, the wider the surface area, and the more concave it is (up to the point where the handle will still fit into the concave area), the better the propject, in terms of the potential for sufficient friction between it and the tool handle. To illustrate the point: a leaf rake propped up against a small diameter tree, or the steel round pipe of an outdoor basketball stand, experiences much less contact friction than does that same rake propped up against the inside corner of intersecting walls, or the narrow slot between two slats of a wooden fence.

To explicitly identify it, then, the second problem related to using a propject, is that due to the width or shape of its contact surface, all else being equal, it may not offer sufficient friction to hold the tool in its propped position, or at least not for the intended duration of the propping episode. Quite simply, a propped tool may have fallen down by the time the worker seeks to re-engage it.

Furthermore, as a third problem, a tool handle may have dirt, oil, grease, water or other slippery contaminants on it, and the propject itself could be dirty, or slippery due to it being manufactured from certain materials, such as the vinyl siding on an outside wall or the metal exterior of a piece of machinery or automobile, so the amount of friction between the contact areas of the tool handle and propject can be further degraded. One also observes further potential for a failed propject-tool interaction in those frequent outdoor situations involving rainy, snowy or windy conditions, all of which affect the ability of a propject to reliably hold a tool in a propped position.

Accordingly, there is a need in the art for a tool that permits a worker to securely prop the tool right on the spot where he/she wishes to disengage from the tool, and to later on, retrieve and re-engage with the tool.

An object, therefore, is to provide a device that keeps the tool in an upright position, making it easier to spot it, and thus making it less apt to be left behind. Moreover, the worker no longer has to waste time looking for a suitable propject, nor stoop over repeatedly over the course of the work project to retrieve his/her tool, which makes the work process more efficient and less stressful upon the back and other body parts. Persons with back problems, or other disabilities, in particular will benefit greatly by using the device. Also, the worker no longer has to worry about damaging his/her tool, or surrounding objects, by using the other two means of disengaging from a tool described heretofore.

SUMMARY

The present disclosure is directed to a device for propping up an object, in particular, a long-handled object.

According to an aspect is a device for propping up an object, comprising a leg apparatus, comprising an elongated length of material having resiliency and formed in a V-shape with first and second legs extending from a vee portion; a leg holder adapted to be fixedly attached to the object and comprising a block that extends away from the object and includes first and second holes formed therethrough that are separated by a bridge of material, wherein the first and second legs extend through the first and second holes, respectively, and the vee portion is securely supported by and positioned adjacent the bridge of material; a latch adapted to be fixedly attached to the object and at a position beneath the leg holder and comprising a tongue adapted to be positioned in spaced relation to the object and that extends upwardly towards the leg holder; and a slider that comprises a body having third and fourth holes formed therethrough that extend in parallel relation to one another and through which the first and second legs of the leg apparatus are adapted to pass, respectively, and a slotted opening formed therein that is adapted to engage with the tongue of the latch, wherein the slider is selectively movable along the first and second legs towards and away from the latch, wherein when moved away from the latch the first and second legs spring apart from one another and away from the object and wherein when the slider is moved towards the latch, the first and second legs compress towards one another and towards the object.

According to an embodiment, the leg holder and the latch are integral with one another and a connecting portion extends therebetween.

According to an embodiment, the slider further comprises opposing side edges each of which is shaped in a concave contour.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes tool for propping up objects, such as long-handled garden tools (e.g., a rake, shovel, broom, hoe, pitch fork), or any other type of object susceptible to falling to the ground when not manually held (e.g., a walking stick, a golf bag). To perform its propping function, the tool serves as two legs of a tripod, with the object itself serving as the third leg.

Referring to the figures, in an embodiment, is a tool 10 for propping up objects 12, such as, for example, a long handled garden tool (e.g., rake), when not in use and to prevent the user from having to bend over and pick the object up off the ground when desiring to begin use of the tool after having set it down. Tool 10 generally comprises several elements: a leg apparatus 14, a leg holder 16, a latch 18, and a slider 20. While the leg holder 16 and latch 18 are fixedly secured to the tool 12, leg apparatus 14 and slider 20 are movable relative to one another to permit leg apparatus 14 to be positioned between propping and stowed positions.

Figure 10:
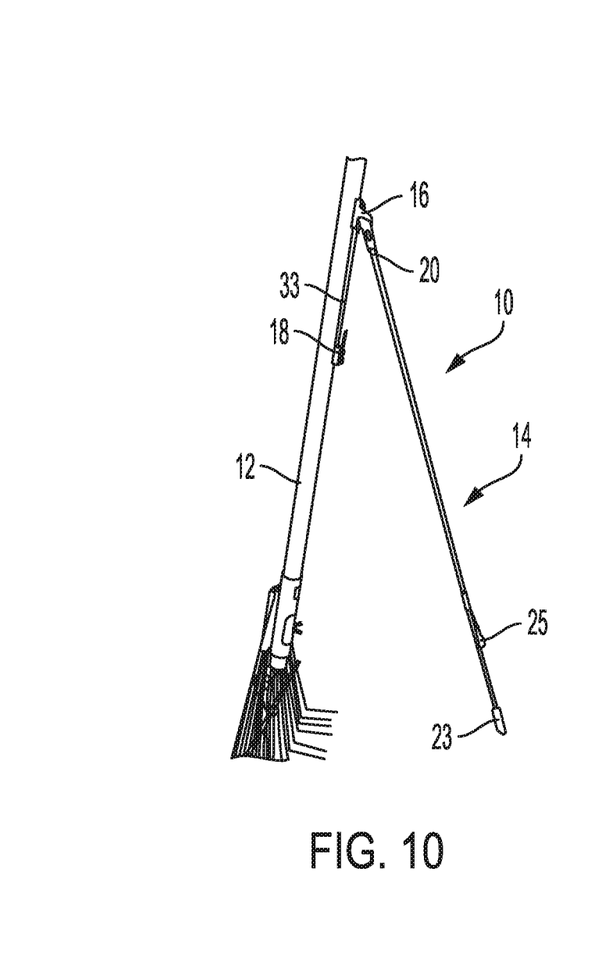
FIG. 10 is a perspective view of a propping tool attached to a rake, in accordance with an embodiment.

Leg apparatus 14 comprises an elongated length of spring steel or other resilient material that is bent such that two legs 22, 24 are formed and intersect at an apex or vee 26 that forms an acute interior angle between the legs when in their neutral, unforced positions. Legs 22 and 24 are of about the same length and can be physically moved towards one another through application of compression force and will naturally spring back to their neutral positions when the force is released. Plastic caps 23, 25 can be attached to the ends of legs 22, 24, respectively, to provide a secure, non-scratch ground contacting element (see FIG. 10).

Leg holder 16 comprises a block 27 adapted to be fixedly secured to the handle/object to be propped up 12 via screws, rivets, or other conventional fasteners. The block 27 includes two parallel holes 28, 30 extending therethrough along axes that are essentially parallel to one another and the handle/object to be propped up 12 and includes a bridge of material between the two holes. Legs 22, 24 pass downwardly through holes 28, 30, respectively, with the apex/vee 26 being supported by the bridge of material between the two holes 28, 30.

Latch 18 is fixed to object 10 below leg holder 16 via screws or other conventional fasteners and includes a tongue 31 that is laterally spaced from object 10 and extends upwardly in a direction towards leg holder 16. Tongue 31 interacts with slider 20 to secure tool 10 in its closed position.

Figure 1:
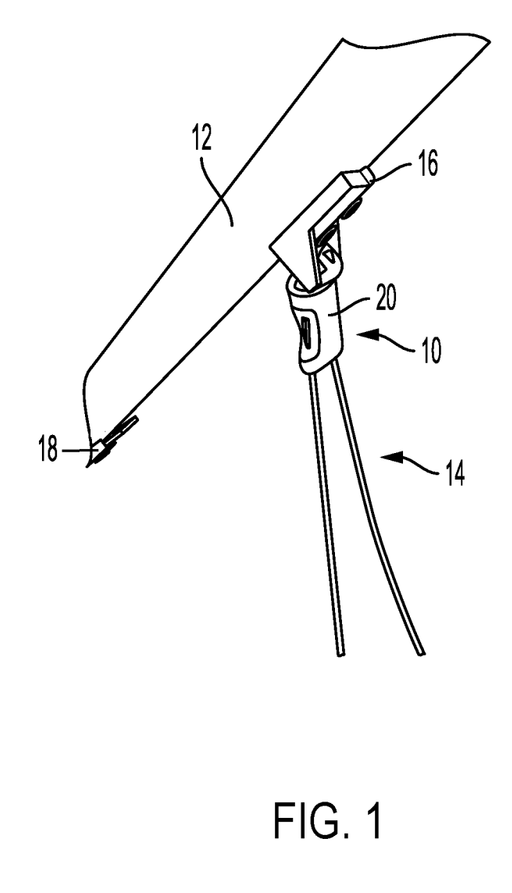
FIG. 1 is a close-up perspective view of a propping tool attached to an object, in accordance with an embodiment.

In one aspect, leg holder 16 and latch 18 are integral with one another with a connecting portion 33 extending therebetween (see FIGS. 2, 3, 4, and 10), while in another aspect, the leg holder 16 and latch 18 are formed as separate elements (see FIG. 1). These members can be composed of a hard plastic material, a suitable metal, or other suitable material known in the art.

Figure 2:
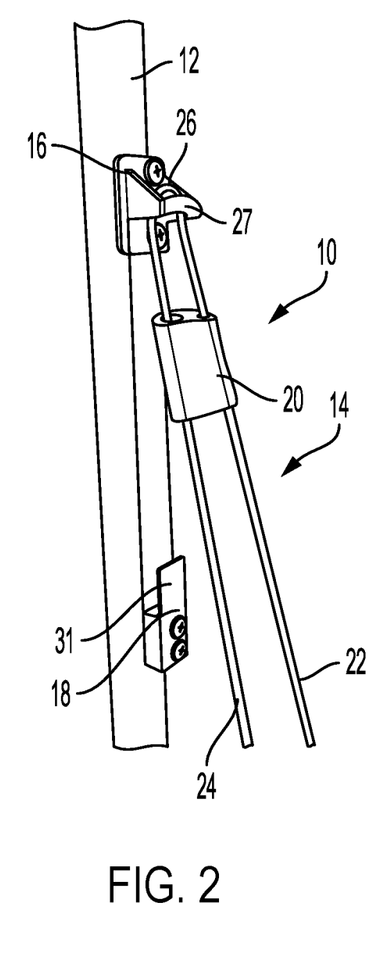
FIG. 2 is a perspective view of a propping tool attached to an object, in accordance with an embodiment.
Figure 3:
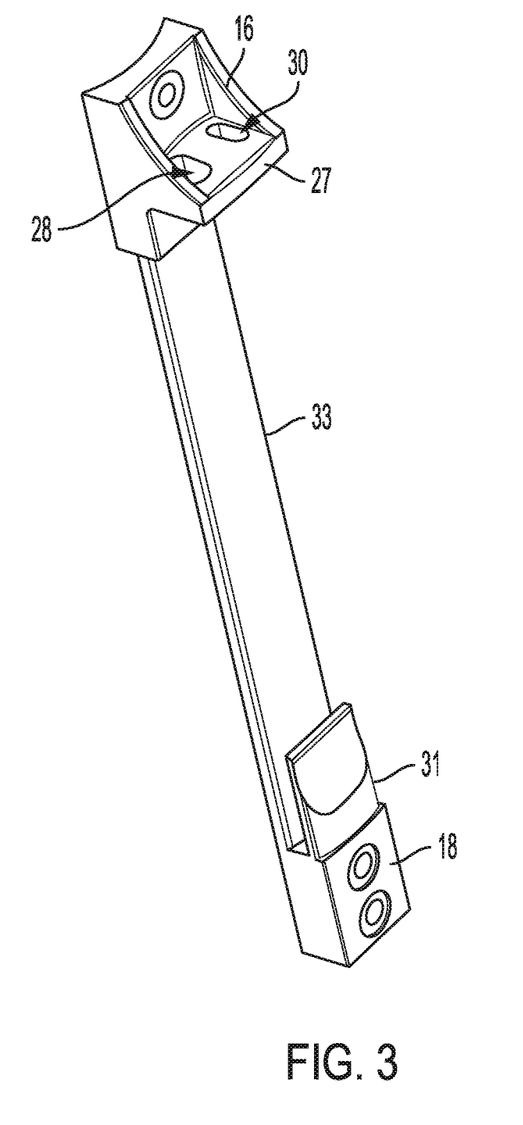
FIG. 3 is a perspective view of elements of a propping tool, in accordance with an embodiment.
Figure 4:
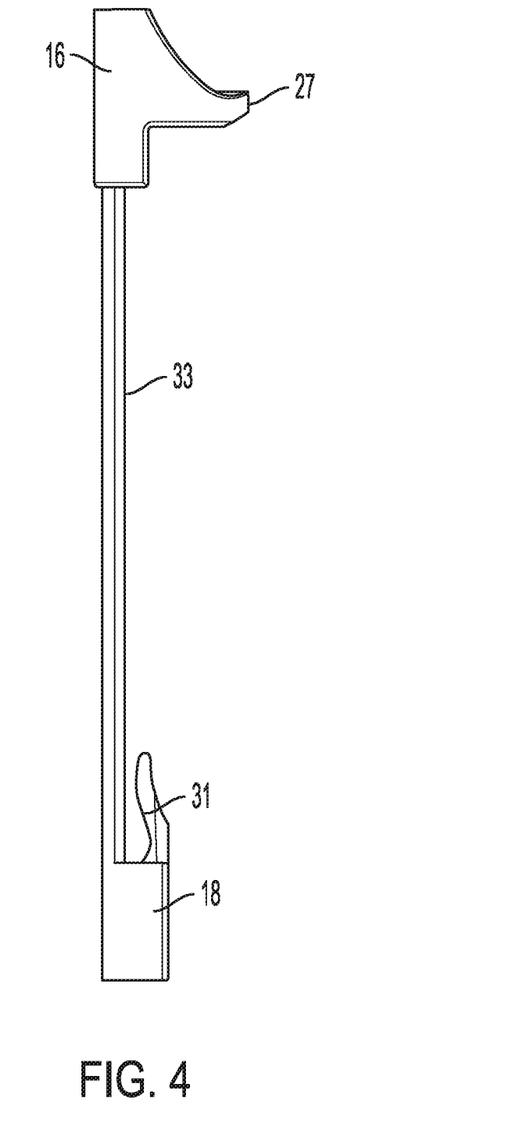
FIG. 4 is a side elevation view of elements of a propping tool, in accordance with an embodiment.
Figure 5:
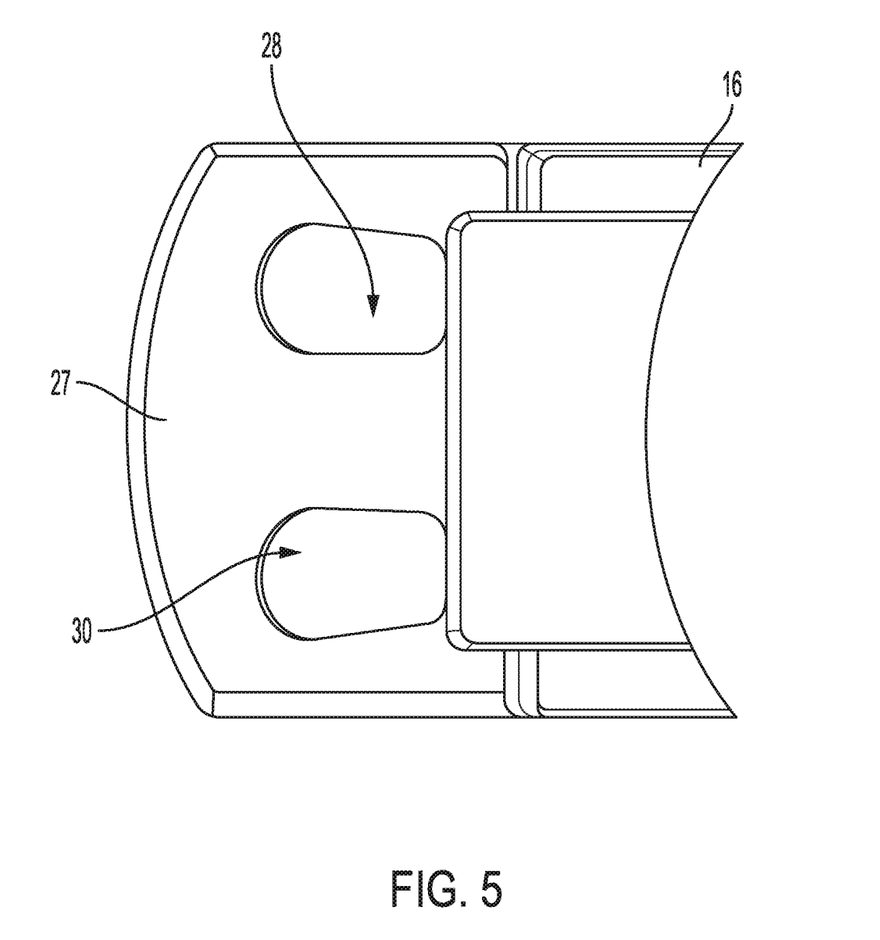
FIG. 5 is a top plan view of a leg holder, in accordance with an embodiment.
Figure 6:
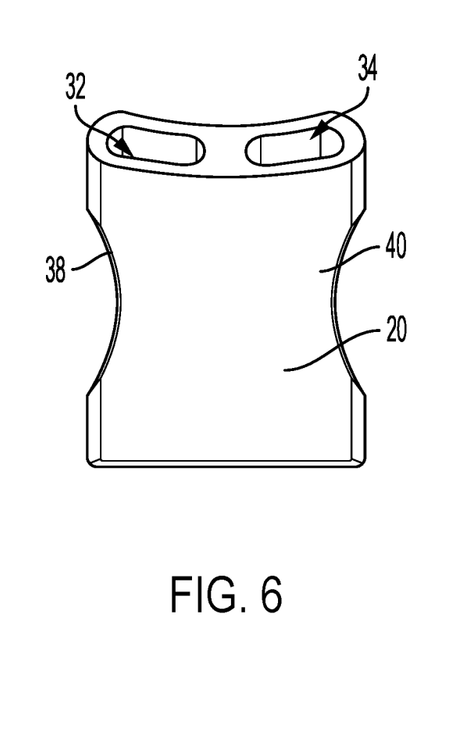
FIG. 6 is a front elevation view of a slider, in accordance with an embodiment.
Figure 7:
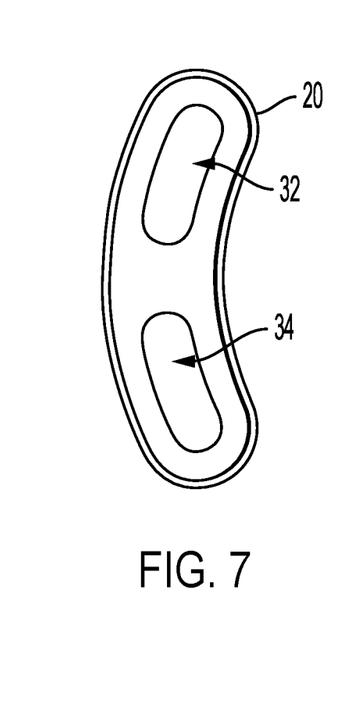
FIG. 7 is a top plan view of a slider, in accordance with an embodiment.
Figure 8:
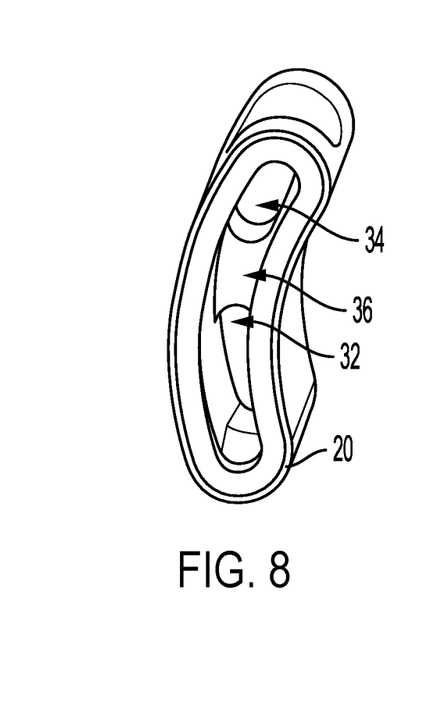
FIG. 8 is a bottom plan view of a slider, in accordance with an embodiment.
Figure 9:
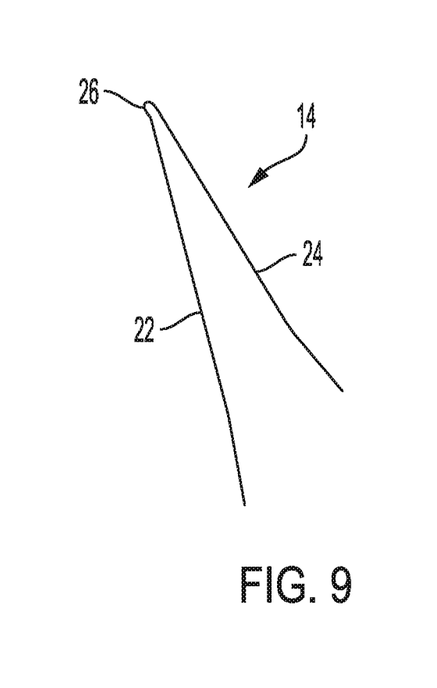
FIG. 9 is a perspective view of a leg apparatus, in accordance with an embodiment.

Slider 20 includes a pair of holes 32, 34, that extend parallel to one another and through which legs 22, 24 pass, respectively, and an open cavity 36 formed in its bottom that engages with latch 18. Slider 20 is elongated in shape and can include contoured, concave sides 38, 40 to permit comfortable positioning of a user's fingers thereon, as seen in FIG. 2, while moving slider 20 up and down legs 22, 24. In use, slider 20 is moved away from leg holder 16 and towards latch 18 when desiring to use object 12 and not have tool 10 propping up object 12. Movement of slider 20 in this downward manner causes legs 22, 24 to be compressed towards one another, and slider 20 to be secured into latch 18 when moved its full distance away from leg holder 16. Legs 22, 24 become essentially stowed in position along the handle/object 12.

To open legs 22, 24 such that they spread apart and spring outwardly away from object 12, slider 20 is slid upwardly towards leg holder 16 and away from latch 18. This sliding movement of slider 20 allows the legs 22, 24 to decompress and spring back to their neutral positions with the tips of the legs being spread apart the largest distance and extending in a V pattern to vee 26. Legs 22, 24 will then serve as two legs of a tripod with the object 12 serving as the third leg of the tripod, thus permitting the object to be propped up without assistance from the user, as seen in FIG. 1.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A device for propping up an object, comprising:
a leg apparatus, comprising an elongated length of material having resiliency and formed in a V-shape with first and second legs extending from a vee portion;
a leg holder adapted to be fixedly attached to the object and comprising a block that extends away from the object and includes first and second holes formed therethrough that are separated by a bridge of material, wherein the first and second legs extend through the first and second holes, respectively, and the vee portion is securely supported by and positioned adjacent the bridge of material;
a latch adapted to be fixedly attached to the object and at a position beneath the leg holder and comprising a tongue adapted to be positioned in spaced relation to the object and that extends upwardly towards the leg holder; and a slider that comprises a body having third and fourth holes formed therethrough that extend in parallel relation to one another and through which the first and second legs of the leg apparatus are adapted to pass, respectively, and a cavity formed therein that is adapted to engage with the tongue of the latch, wherein the slider is selectively movable along the first and second legs towards and away from the latch, wherein when moved away from the latch the first and second legs spring apart from one another and away from the object and wherein when the slider is moved towards the latch, the first and second legs compress towards one another and towards the object;

wherein the leg holder and the latch are integral with one another and a connecting portion extends therebetween.

2. A device for propping up an object, comprising:

a leg apparatus, comprising an elongated length of material having resiliency and formed in a V-shape with first and second legs extending from a vee portion;

a leg holder adapted to be fixedly attached to the object and comprising a block that extends away from the object and includes first and second holes formed therethrough that are separated by a bridge of material, wherein the first and second legs extend through the first and second holes, respectively, and the vee portion is securely supported by and positioned adjacent the bridge of material;

a latch adapted to be fixedly attached to the object and at a position beneath the leg holder and comprising a tongue adapted to be positioned in spaced relation to the object and that extends upwardly towards the leg holder; and a slider that comprises a body having third and fourth holes formed therethrough that extend in parallel relation to one another and through which the first and second legs of the leg apparatus are adapted to pass, respectively, and a cavity formed therein that is adapted to engage with the tongue of the latch, wherein the slider is selectively movable along the first and second legs towards and away from the latch, wherein when moved away from the latch the first and second legs spring apart from one another and away from the object and wherein when the slider is moved towards the latch, the first and second legs compress towards one another and towards the object;

wherein the slider further comprises opposing side edges each of which is shaped in a concave contour to facilitate gripping of the slider.

* * * * *